US006691977B2

(12) United States Patent
Knebel et al.

(10) Patent No.: US 6,691,977 B2
(45) Date of Patent: Feb. 17, 2004

(54) SHAPE MEMORY ALLOY FUEL INJECTOR

(75) Inventors: Albert M. Knebel, Holcomb, NY (US); Mike R. Salemi, Rochester, NY (US)

(73) Assignee: Delphi Technologies, Inc., Troy, MI (US)

(*) Notice: Subject to any disclaimer, the term of this patent is extended or adjusted under 35 U.S.C. 154(b) by 109 days.

(21) Appl. No.: 09/809,771

(22) Filed: Mar. 16, 2001

(65) Prior Publication Data
US 2002/0130284 A1 Sep. 19, 2002

(51) Int. Cl.[7] .............................................. F16K 31/02
(52) U.S. Cl. ................... 251/11; 60/527; 239/553.3; 239/590.3
(58) Field of Search ...................... 251/11, 129.01, 251/129.06; 60/527, 528; 239/75, 102.2, 553, 553.3, 590, 590.3

(56) References Cited
U.S. PATENT DOCUMENTS

| | | | |
|---|---|---|---|
| 3,835,659 A | * | 9/1974 | McBride, Jr. ............... 62/202 |
| 4,660,760 A | * | 4/1987 | Bennett et al. ............... 236/59 |
| 4,864,824 A | | 9/1989 | Gabriel et al. ............... 60/527 |
| 4,973,024 A | | 11/1990 | Homma ...................... 251/11 |
| 5,061,914 A | | 10/1991 | Busch et al. ................ 337/140 |
| 5,295,509 A | * | 3/1994 | Suto et al. .......... 251/129.06 X |
| 5,325,880 A | | 7/1994 | Johnson et al. ............... 137/1 |
| 5,825,275 A | | 10/1998 | Wuttig et al. ............... 337/139 |
| 5,984,258 A | * | 11/1999 | Knebel et al. ............... 251/11 |
| 6,019,113 A | | 2/2000 | Allston et al. ............... 137/1 |

* cited by examiner

Primary Examiner—Michael Mar
Assistant Examiner—Eric Keasel
(74) Attorney, Agent, or Firm—Patrick M. Griffin

(57) ABSTRACT

An actuator for controlling the flow of a fluid stream through a valve comprising a shape memory alloy element that positions a valve element to a first position when said SMA element is in an ambient temperature state and a second position when said SMA element is in an elevated temperature state, and a flow plate situated in the fluid stream in a position upstream of the SMA element and having a through-hole pattern to increase the velocity of fluid around the SMA element while it is in its elevated temperature state so as to cool the SMA element by fluid controlled by said valve and return the SMA element to its ambient temperature state.

15 Claims, 3 Drawing Sheets

SHAPE MEMORY ALLOY FUEL INJECTOR

TECHNICAL FIELD

This invention relates to the control of an actuator of a fuel injector incorporating a shape memory alloy element.

BACKGROUND OF THE INVENTION

Various metallic materials capable of exhibiting shape-memory characteristics are well known in the art. These shape-memory capabilities occur as the result of the metallic alloy undergoing a reversible crystalline phase transformation from one crystalline state to another crystalline state with a change in temperature and/or external stress. In particular, it was discovered that alloys of nickel and titanium exhibited these remarkable properties of being able to undergo energetic crystalline phase changes at ambient temperatures, thus giving them a shape-memory. These shape-memory alloy ("SMA") materials, if deformed while cool, will revert, exerting considerable force, to their original, undeformed shape when warmed. These energetic phase transformation properties render articles made from these alloys highly useful in a variety of applications. An article made of alloy having shape-memory properties can be deformed at a low temperature from its original configuration, but the article "remembers" its original shape, and returns to that shape when heated.

For example, in nickel-titanium alloys possessing shape-memory characteristics, the alloy undergoes a reversible transformation from an austenitic state to a martensitic state with a change in temperature. This transformation is often referred to as a thermoelastic martensitic transformation. The reversible transformation of the NiTi alloy between the austenite to the martensite phases occurs over two different temperature ranges which are characteristic of the specific alloy. As the alloy cools, it reaches a temperature ($M_s$) at which the martensite phase starts to form, and finishes the transformation at a still lower temperature ($M_f$). Upon reheating, it reaches a temperature ($A_s$) at which austenite begins to reform and then a temperature ($A_f$) at which the change back to austenite is complete. In the martensitic state, the alloy can be easily deformed. When sufficient heat is applied to the deformed alloy, it reverts back to the austenitic state, and returns to its original configuration.

SMA materials previously have been produced in bulk form, in the shape of wires, rods, and plates, for utilities such as pipe couplings, electrical connectors, switches, and actuators, and the like. Actuators previously have been developed, incorporating shape-memory alloys or materials, which operate on the principal of deforming the shape-memory alloy while it is below its phase transformation temperature range and then heating it to above its transformation temperature range to recover all or part of the deformation, and, in the process of doing so, create movements of one or more mechanical elements. These actuators utilize one or more shape-memory elements produced in bulk form, and, therefore are limited in size and usefulness.

The unique properties of SMA's further have been adapted to microelectromechanical systems ("MEMS") applications such as micro-valves and micro-actuators by means of thin film technology. Micro-actuators are desirable for such utilities as opening and closing valves, activating switches, and generally providing motion for micro-mechanical devices. The most well-known and most readily available SMA is an alloy of nickel and titanium. NiTi SMA has been extensively investigated as one of the most promising materials for MEMS such as microvalves and micro-actuators. NiTi SMA features the major advantages of having a large output force per unit volume, and the capability to serve as structural components as well as active components. It is reported that the advantageous performance of micro-actuators is attributed to the fact that the shape-memory effect of the stress and strain can produce substantial work per unit of volume. For example, the work output of nickel-titanium shape-memory alloy is of the order of 1 joule per gram per cycle. A shape-memory film-actuator measuring one square millimeter and ten microns thick is estimated to exert about 64 microjoules of work per cycle. With a temperature change of as little as about 10° C., this alloy can exert a pressure or stress of as much as 415 MPa when applied against a resistance to changing its shape from its deformation state.

The application of shape memory alloy materials to a precision metering device such as an automotive fuel injector presents additional significant challenges in terms of control of the temperature related shape transformation corresponding to the inherent bi-stable crystalline structure of the SMA element. While the high temperature state transformation of the SMA element can be quickly accomplished by application of relatively high power, transition of the SMA element back to its ambient temperature state is dependent on cooling of the SMA element by fluid circulating through the injector upon termination of power application to the SMA element.

SUMMARY OF THE INVENTION

Now, according to the present invention, an improved apparatus and method for opening and closing an SMA flow actuator in a fluid stream has been developed. The actuator apparatus includes a shape memory alloy element that positions a valve element to a closed or open position, and a flow plate situated in the fluid stream in a position upstream of the SMA element. The flow plate features a through-hole pattern designed to increase the velocity of fluid flowing around the SMA element while it is in its activated, high temperature state. Preferably, the flow plate additionally is positioned to serve as a heatsink element to prevent SMA element overheating during activation.

The operation of the actuator involves applying a voltage to the SMA element to transform it to an activated position in its elevated temperature state. To transform the SMA element to its deactivated position, the applied voltage is removed, and the flow of fluid through the flow plate quickly cools the SMA element causing it to return to its deactivated position. When the SMA element is in its activated position, preferably, it is moved into thermal contact with the flow plate which also serves as a heatsink element.

BRIEF DESCRIPTION OF THE DRAWINGS

The above-discussed and other features and advantages of the present invention will be appreciated and understood by those skilled in the art from the following detailed description, and drawings, wherein like elements are designated by like numerals in the several figures.

Referring now to the drawings.

DETAILED DESCRIPTION OF PREFERRED EMBODIMENTS

Figure 1:
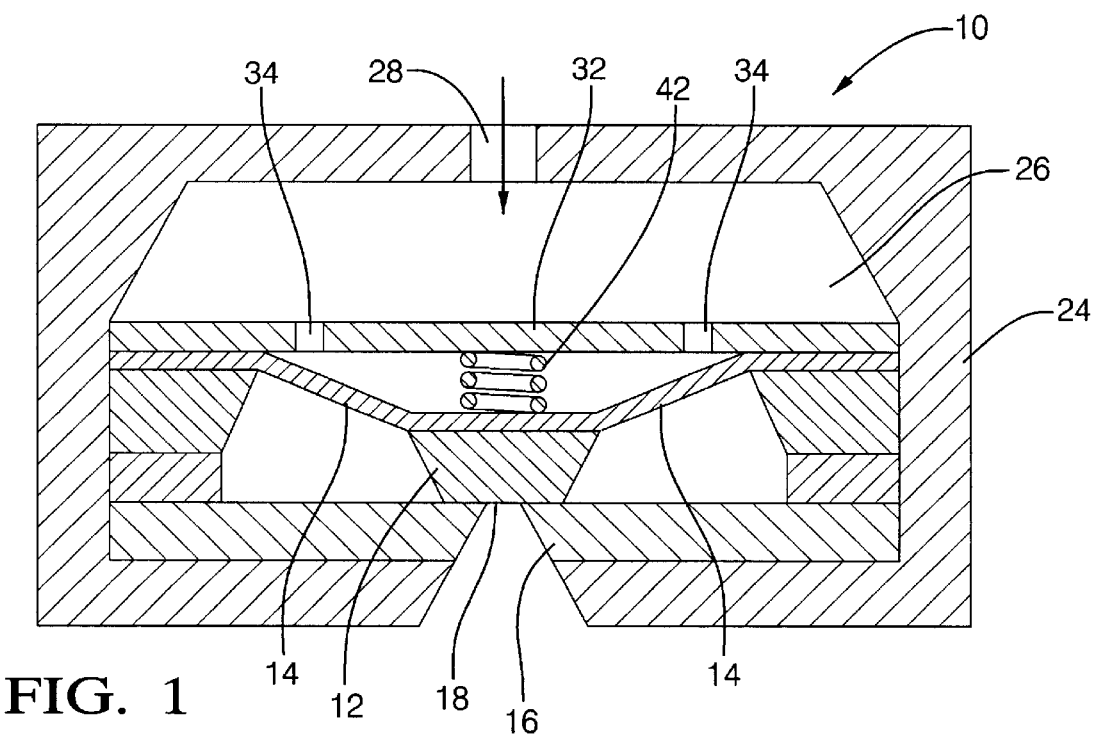
FIG. 1 is a cross-sectional view of a fuel injector actuator having an SMA element and a flow plate wherein the fuel injector actuator is in the closed position.

Referring now to FIG. 1, the reference numeral 10 generally designates an actuator for an automotive fuel injector. The actuator 10 includes a valve element 12 and a shape memory alloy (SMA) element 14 in contact with and controlling the positioning of the valve element 12. The SMA element 14 is supported on a metering plate 16 having a central flow orifice 18. The valve element 12 can be positioned in the closed valve position as shown in FIG. 1, or in an open position, allowing flow through orifice 18, when SMA element 14 assumes a generally horizontal shape, pulling valve element 12 away from the opening of orifice 18. A housing number 24 generally surrounds the metering plate 16 and defines a fuel cavity 26, and a flow inlet 28. Central flow orifice 18 is coupled to the intake chamber of an internal combustion engine. In operation, fuel enters the fuel injector through flow inlet 28 and fills fuel cavity 26. If valve element 12 is in the open position, the fuel flows through central flow orifice 18.

The actuator 10 also is equipped with a flow plate 32, just upstream of SMA element 14, fitted with flow accelerating orifices 34. These flow-accelerating orifices are arranged to direct a flow of fuel with increased velocity onto SMA element 14, thereby serving to rapidly cool SMA element 14 to the ambient temperature of the fuel in the reservoir.

Figure 9:
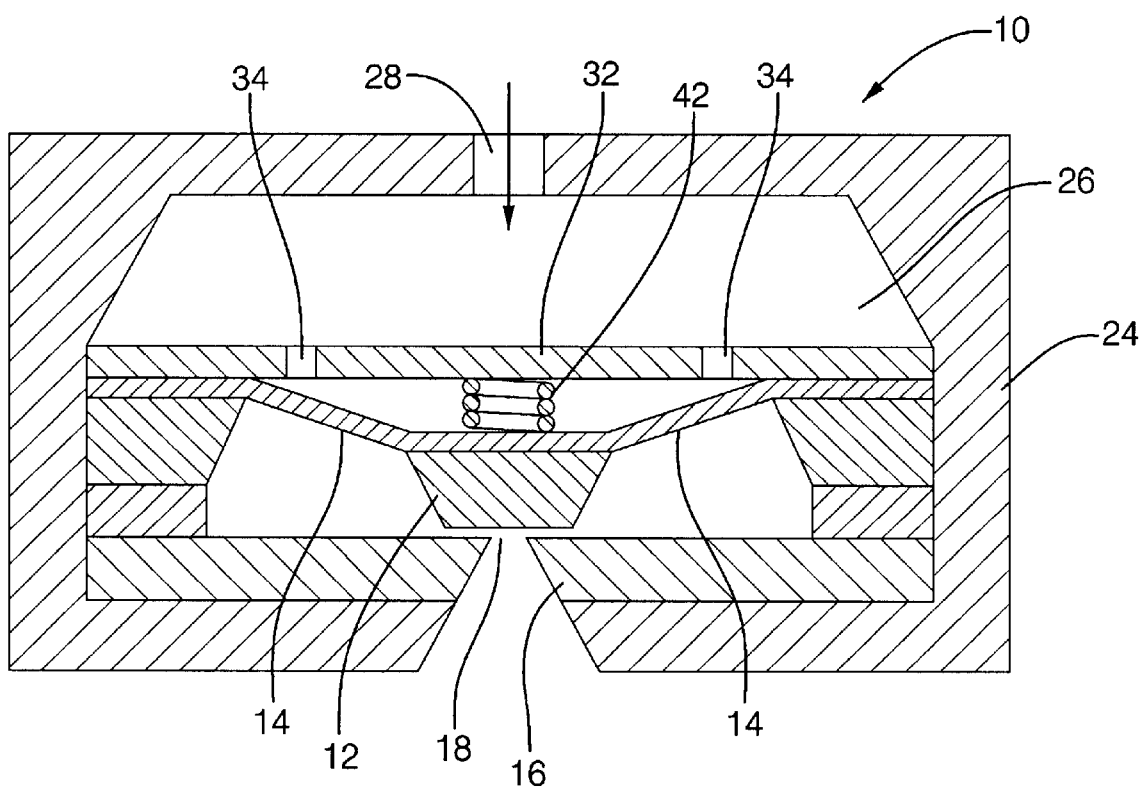
FIG. 9 is a cross-sectional view of a fuel injector actuator having an SMA element and a flow plate wherein the fuel injector is in the open position.

As illustrated in FIG. 1, actuator 10 is designed so that valve element 12 is in a closed position when SMA element is in a deactivated ambient temperature state. At this ambient temperature, the SMA element is at or below a first characteristic temperature, referred to as the martensite finish temperature (Tmf). When heated to a second characteristic temperature, referred to as the austenite start temperature (Tas) by electric resistance heating, the SMA element 14 begins a crystalline phase change which is completed when SMA element 14 reaches a third characteristic temperature, referred to as the austenite finish temperature (Taf). During this phase change, the SMA element shrinks in length to assume a generally horizontal flat shape and move valve element 12 to an open position away from central flow orifice 18. Accordingly, to operate actuator 10, SMA element 14 is heated by electric resistance heating to shrink and open valve element 12 (FIG. 9). When it is desired to close valve element 12, electric heating of the SMA element 14 is terminated, and SMA element 14 is cooled by the flow of ambient temperature fuel though fuel cavity 26. Although in the illustrated embodiment, valve element 12 is in the closed position at ambient fuel temperature, and in the open position when SMA element 14 is heated, it will be understood that the actuator 10 could just as well operate in reverse so that valve element 12 is open at ambient fuel temperature and closed when SMA element 14 is heated.

In controlling the actuator 10, maximum performance is achieved by quickly heating SMA element 14 at the start of the injector signal to quickly and fully open valve element 12 to allow fuel flow to the intake chamber of the engine, and then cooling SMA element 14 at the end of the injection signal to quickly and fully close valve element 12 to cut off fuel flow. Fast heating of SMA element 14 readily can be effected by passing a large current through it; the rate of cooling, however, is dependent on the ambient temperature condition of the fuel. In order to maximize the cooling effect of the fuel, the invented actuator is equipped with flow plate 32, fitted with flow accelerating orifice 34. Fuel passing through fuel cavity 26 is forced to flow through orifice 34 increasing the velocity of the fuel directed onto SMA element 14. In this manner, SMA element 14 is cooled more effectively and the response time to return SMA element 14 to its ambient temperature martensite finish phase is reduced. In an arrangement, as illustrated in FIG. 1, wherein the valve is operated in a dead head operation with no bypass of excess fuel and recirculation to the fuel reservoir, and the valve element 12 in the closed position serves to prevent flow of fluid through the the body of the valve, the absence of fuel flow past the SMA element 14, when it is in the closed position, allows for minimal heat transfer to the fluid, resulting in faster response when power is applied to activate SMA element 14 and effect the opening of the valve element 12.

In heating SMA element 14 to open valve element 12, overheating of SMA element 14 must be avoided to prevent thermal damage to the element. Also, overheating SMA element 14 (even without thermal damage) impairs the ability to quickly cool SMA element 14 when it is desired to close valve element 12. Accordingly, flow plate 32 preferably is situated in the fuel flow stream in a position just up-stream of SMA element 14 so as to be in thermal contact with the SMA element 14 when element 14 is in its open valve elevated temperature state. Preferably, flow plate 32 is fabricated of a material having a heat capacity higher than that of the SMA element 14. The shape and position of the flow plate 32 is such that when the SMA element 14 travels to its activated elevated temperature position, the SMA element 14 would come in contact with and transfer heat energy to the flow plate 34. In this manner, the flow plate 34 also serves as a heatsink to prevent overheating of SMA element 14.

Shape memory alloys may be "one-way" trained, that is they can recover its shape in only one way, by heating. These unique alloys also have the capability to recover a present shape upon heating above their transformation temperature and then return to an alternate preset shape upon cooling. This is known as "two-way" memory. Two-way memory shape memory alloys have some marked limitations which must be addressed before attempting to exploit their behavior. These limitations include transformation forces upon cooling that are quite low, a reduced amount of recoverable strain, susceptibility to memory erasure with even slight overheating, and unknown long-term fatigue and stability characteristics. Accordingly, while either one-way or two-way shape memory alloy elements could be used in the present invention, one-way shape memory alloy elements are preferred. In the embodiment as shown in FIG. 1, one way shape memory alloy element 14 is depicted with a spring member 42 arranged to apply a biasing force against shape memory element 14 when it is in its open activated position. When resistance heating is terminated and shape memory element 14 is cooled to ambient fuel temperature, spring number 42 forces shape memory element 14 into its closed, deactivated position, as shown.

The shape memory alloy used in the present invention may be any type of such alloys that exhibits the required characteristics for the specific intended application. Typical shape memory alloys are nickel-titanium based alloys. While the martensite start point for the common commercially available nickel-titanium alloys barely exceeds about 80° C., numerous potential applications for shape-memory alloys now require materials featuring phase transformation temperatures above about 100° C. In order to meet higher temperature applications, ternary alloys have been investigated, using various additional metallic elements. For example, substitution of noble metals (Au, Pd, Pt) for Ni in NiTi alloys successfully accomplishes higher temperature phase transformations. Ternary nickel-titanium shape-memory alloys including a zirconium or hafnium component also appear to be potentially economical high temperature shape-memory candidates.

Figure 2:
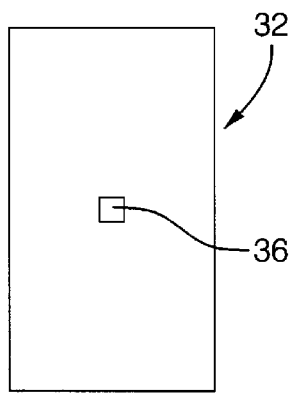
FIGS. 2–6 are top views of various embodiments of flow plates utilized in the present invention.
Figure 3:
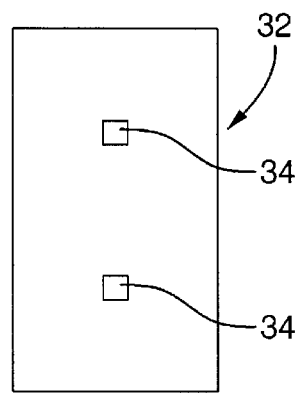
Figure 4:
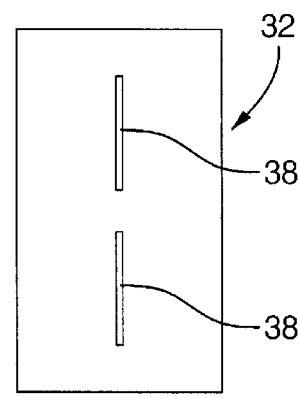
Figure 5:
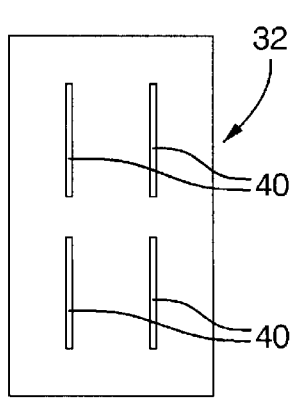
Figure 6:
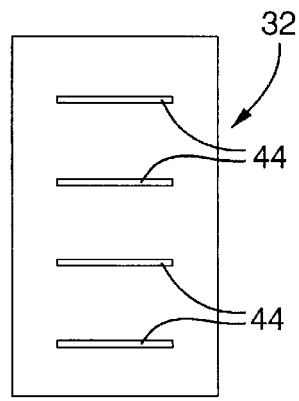

FIGS. 2–6 illustrate various flow plate designs with orifice shapes and locations to optimize fluid flow velocity, flow area, and/or heat sink capacity. FIG. 2 shows flow plate 32 with a single central orifice 36. This embodiment offers a maximized heat sink capability and a large flow area for cavitation suppression. FIG. 3 depicts the flow plate as shown in the actuator of FIG. 1. This embodiment features an improved localization of high velocity fluid flow over SMA element 14, but this is accomplished at some compromise of optimal heat sink function. FIG. 4 is a flow plate 34 including dual slots 38 which results in a sheet flow of fuel over SMA element 14, but with reduced heat sinking capability. FIG. 5 is a flow plate featuring two sets of dual slot orifices 40 to increase fluid flow outside and past the SMA element legs; heat sink performance is enhanced. FIG. 6 shows a flow plate 34 embodiment with four-slot orifice 40 which provide two crossing jets over the SMA element 14, but again at compromised heat sinking capability.

Figure 7:
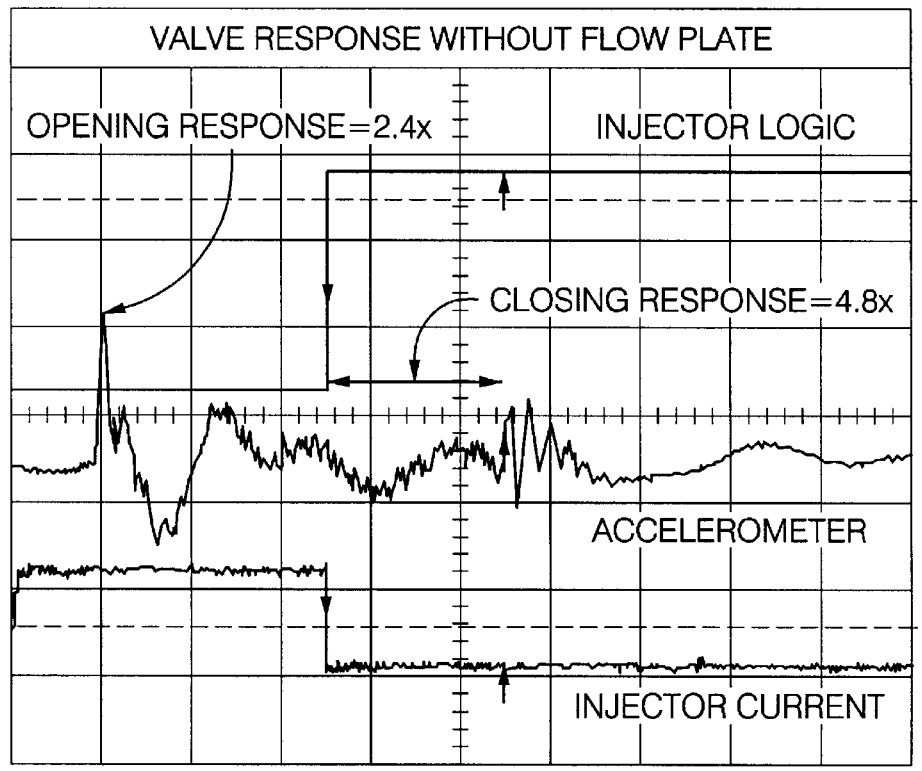
FIGS. 7 and 8 are graphs of oscilloscope traces of the same valve under the same output operating conditions with an SMA element to open and close the valve element, but with and without a flowplate according to the present invention.
Figure 8:
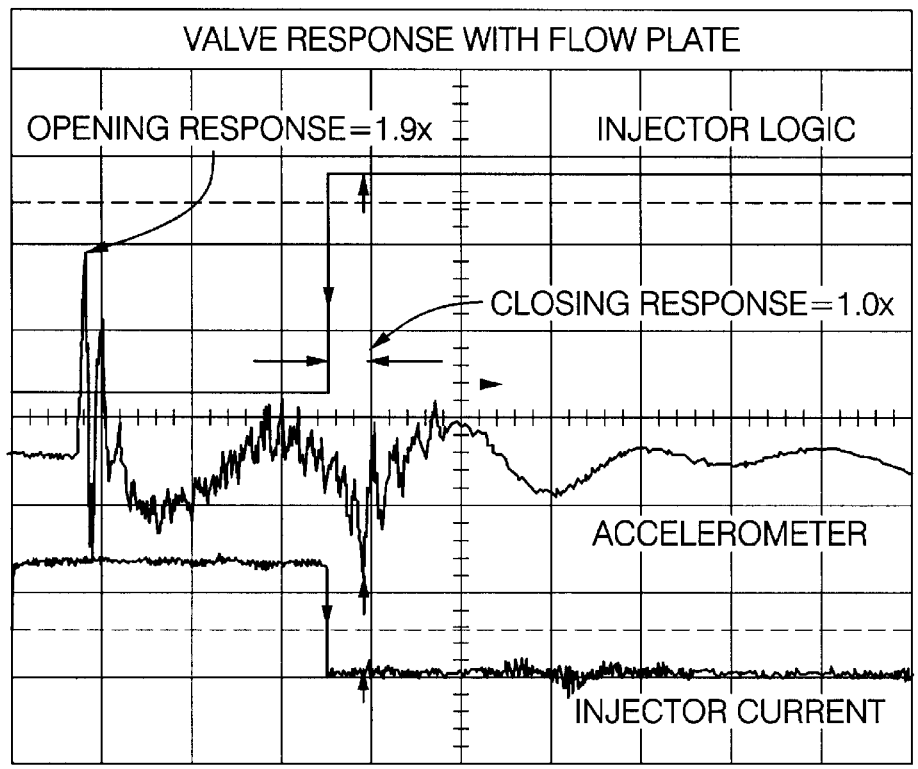

Finally, FIGS. 7 and 8 are oscilloscope traces of the same valve under the same output operating conditions with an SMA element to open and close the valve element. The valve of FIG. 7 includes a flowplate according to the present invention (of the design depicted in FIG. 3), and the valve of FIG. 8 is without a flowplate installed.

Shown in each of the graphs are 3 curves per trace:

1. An injector valve element logic curve which signals application of power to the actuator.
2. An accelerometer curve which detects injector valve element motion.
3. An injector valve element current curve which indicates the current level through the actuator.

FIG. 7 shows the oscilloscope trace of the actuator without the flowplate installed. The Closing Response of the actuator defined as the time between the Logic High Signal and the injector valve close position is called out as 4.8×.

FIG. 8 shows the oscilloscope trace of the actuator with the flowplate installed. The Closing Response of the injector is called out in this trace as 1.0×.

A comparison of the opening response between the two curves shows that the opening response with the flowplate is approximately 20% faster than without the flowplate. This improvement is attributed to the fact that slightly higher power can be applied to the actuator with the flowplate without the issue of overheating since there is enhanced cooling due to the flowplate when the valve begins to open and is in the full open position.

The response time values are normalized to the faster closing response (with the flowplate installed).

Various other embodiments of other modifications of the disclosed embodiments will be apparent to those skilled in the art upon reference to this description, or may be made without departing from the spirit and scope of the invention defined in the appended claims.

We claim:

1. An actuator for controlling a flow of a fluid stream through a valve comprising:
    a shape memory alloy element that positions a valve element to a first position when said SMA element is in an ambient temperature state and a second position when said SMA element is in an elevated temperature state; and
    a flow plate situated in the fluid stream in a position upstream of the SMA element and having a through-hole pattern to increase the velocity of the flow of the fluid stream around the SMA element while it is in its elevated temperature state so as to cool the SMA element by the flow of the fluid stream controlled by said valve and return the SMA element to its ambient temperature state, wherein the flow plate, comprising a material having a heat capacity higher than that of the SMA element, is situated in a position so as to be in thermal contact with the SMA element where said SMA element is in its elevated temperature state.

2. The actuator of claim 1 wherein said flow plate comprises a silicon material.

3. The actuator of claim 1 wherein said SMA element comprises a one-way memory shape memory alloy.

4. The actuator of claim 1 comprising a spring member positioned to apply a biasing force to said SMA element when said SMA element is in its elevated temperature state.

5. The actuator of claim 1 wherein the shape memory alloy element positions the valve element to a closed position when said SMA element is in an ambient temperature state and an open position when said SMA element is in an elevated temperature state.

6. The actuator of claim 1 wherein the valve element in the first position serves to prevent the flow of the fluid stream through the valve, thereby minimizing heat transfer from the SMA element to the fluid stream, so as to reduce the opening response of the SMA element when power is applied.

7. An actuator for controlling a flow of a fluid stream through a valve comprising:
    a shape memory alloy element that positions a valve element to a first position when said SMA element is in an ambient temperature state and a second position when said SMA element is in an elevated temperature state; and
    a flow plate situated in the fluid stream in a position upstream of the SMA element and having a through-hole pattern to increase the velocity of the flow of the fluid stream around the SMA element while it is in its elevated temperature state so as to cool the SMA element by the flow of the fluid stream controlled by said valve and return the SMA element to its ambient temperature state;
    wherein said flow plate is situated in a position so as to be in thermal contact with the SMA element when said SMA element is in its elevated temperature state, and wherein said flow plate comprises a material having a heat capacity higher than that of the SMA element.

8. The actuator of claim 7 wherein said SMA element comprises a one-way memory shape memory alloy.

9. The actuator of claim 7 wherein the shape memory alloy element positions the valve element to a closed position when said SMA element is in an ambient temperature state and an open position when said SMA element is in an elevated temperature state.

10. The actuator of claim 7 wherein the valve element in the first position serves to prevent the flow of the fluid stream through the valve, thereby minimizing heat transfer from the SMA element to the fluid stream, so as to reduce the opening response of the SMA element when power is applied.

11. The actuator of claim 7 wherein said flow plate comprises a silicon material.

12. An actuator for controlling a flow of a fluid stream through a valve comprising:

a shape memory alloy element that positions a valve element to a first position when said SMA element is in an ambient temperature state and a second position when said SMA element is in an elevated temperature state; and a flow plate situated in the fluid stream in a position upstream of SMA element and having a through-hole pattern to increase the velocity of the flow of the fluid stream wound the SMA element while it is in its elevated temperature state so as to cool the SMA element by the flow of the fluid stream controlled by said valve and return the SMA element to its ambient temperature state; and a spring member positioned to apply a biasing force to said SMA element when said SMA element is in its elevated temperature state.

13. The actuator of claim 12 wherein said SMA element comprises a one-way memory shape memory alloy.

14. The actuator of claim 12 wherein the shape memory alloy element positions the valve element to a closed position when said SMA element is in an ambient temperature state and an open position when said SMA element is in an elevated temperature state.

15. The actuator of claim 12 wherein the valve element in the first position serves to prevent the flow of the fluid stream through the valve, thereby minimizing heat transfer from the SMA element to the fluid stream, so as to reduce the opening response of the SMA element when power is applied.

* * * * *